United States Patent [19]
Yasuoka et al.

[11] 4,008,877
[45] Feb. 22, 1977

[54] BUTTERFLY VALVE APPARATUS

[75] Inventors: Masahiro Yasuoka; Yoshitsugu Okada, both of Hirakata, Japan

[73] Assignee: Kubota, Ltd., Osaka, Japan

[22] Filed: Aug. 6, 1975

[21] Appl. No.: 602,411

Related U.S. Application Data

[63] Continuation of Ser. No. 419,368, Nov. 27, 1973, abandoned.

[30] Foreign Application Priority Data

Nov. 30, 1972 Japan .............................. 47-120382

[52] U.S. Cl. ............................ 251/249.5; 251/229; 251/305; 251/308
[51] Int. Cl.² .......................................... F16K 31/44
[58] Field of Search ............... 251/249.5, 279, 304, 251/305, 306, 307, 308, 315, 58, 213, 228, 229, 173, 175; 74/89.15

[56] References Cited

UNITED STATES PATENTS

| | | | |
|---|---|---|---|
| 1,672,430 | 6/1928 | Schnyder | 251/249.5 |
| 2,876,984 | 3/1959 | Reppert | 251/308 |
| 2,913,218 | 11/1959 | Broz | 251/307 |
| 2,974,921 | 3/1961 | Kaswan | 251/58 |
| 3,064,938 | 11/1962 | Knox | 251/315 |
| 3,245,655 | 4/1966 | Oetjens | 251/315 |
| 3,376,015 | 4/1968 | Forsman et al. | 251/306 |
| 3,425,439 | 2/1969 | Duffey et al. | 251/308 |
| 3,608,861 | 9/1971 | Helman et al. | 251/306 |
| 3,642,247 | 2/1972 | Scaramucci | 251/308 |
| 3,647,179 | 3/1972 | Scaramucci et al. | 251/315 |
| 3,656,711 | 4/1972 | Toelke | 251/315 |

*Primary Examiner*—Martin P. Schwadron
*Assistant Examiner*—G. L. Walton
*Attorney, Agent, or Firm*—Edwin E. Greigg

[57] ABSTRACT

A butterfly valve apparatus comprising a rotating shaft, a valve stem movable by the rotating shaft through a coupling member and a valve plate fixed within a valve housing to the valve stem.

6 Claims, 5 Drawing Figures

BUTTERFLY VALVE APPARATUS

This is a continuation of application Ser. No. 419,368 filed Nov. 27, 1973 now abandoned.

BACKGROUND OF THE INVENTION

The present invention relates to a butterfly valve apparatus which comprises a valve housing and a valve plate positioned within the housing and which is adapted to be mounted on pipes or the like for conveying fluids, the valve plate being fixed to a valve stem rotatable by rotating means to open or close the fluid passage in the pipe and to thereby permit or stop the flow of fluid.

Various butterfly valve apparatuses of the type described above have heretofore been provided in which the valve plate is fixed to the valve stem the conventional construction being such that the valve stem is rigidly connected to rotating means by a coupling member. The valve stem is supported by bearing members on the valve housing, with a minute clearance formed between the valve stem and the bearing members as required for lubrication. Accordingly, with opening or closing of the valve plate and in response to a change in the direction of flow of the fluid within the valve, the valve stem is movable by a small amount corresponding to the clearance, with the result that the fluid pressure on the valve plate acts not only on the bearing members for the valve stem but also on the coupling member on the rotating means which is rigidly connected to the valve stem, thereby subjecting the coupling member or the gear surfaces and shaft of rotating means to an objectionable high pressure, which accelerates the abrasion of gears and bearings and increases the load. Consequently, smooth rotation is impaired or, conversely, the gears can not mesh with each other to a full extent, failing to effect the desired transmission of torque.

SUMMARY OF THE INVENTION

The present invention has overcome the foregoing conventional drawbacks to provide a butterfly valve apparatus which is operable smoothly under a constant predetermined load irrespective of the fluid pressure or manufacturing errors.

The butterfly valve apparatus according to this invention comprises a valve housing, two bearing members mounted in the valve housing and opposing each other, a valve stem mounted in the valve housing by the bearing members, a valve plate fixed to the valve stem, rotating means for rotating the valve stem and a coupling member for operatively connecting the rotating means to the valve stem, the coupling member permitting relative movement between the valve stem and the rotating means in a direction substantially parallel to the direction of action of liquid pressure when the liquid pressure acts on the valve plate closing a flow passage, the valve stem and the rotating means being thus rendered movable relative to each other by an amount slightly greater than the amount of movement allowed for the valve stem and the bearing members relative to each other.

Thus the coupling member permits the valve stem and the rotating means to move relative to each other by an amount slightly greater than the amount of movement allowed for the valve stem and the bearing members relative to each other, so that an external force on the valve stem due to liquid pressure acting on the valve plate, especially due to high pressure produced when the valve is to be opened from its fully closed position, can be counteracted by the supporting force of the bearing members for the valve stem, rendering the rotating means free of the external force on the valve stem due to the liquid pressure. Accordingly, the coupling member and the rotating means are protected from objectionable load to assure smooth and reliable valve operation all the time even in the presence of liquid pressure acting on the valve plate or in spite of some errors involved in the position of the valve stem relative to the rotating means.

An object of this invention is to provide an apparatus which is operable as a valve reliably and smoothly all the time and serviceable smoothly over a prolonged period of time without being influenced by the pressure of fluid flowing through the flow passage and by errors involved in machining the valve stem and like members.

Another object of this invention is to provide a valve which is operable easily and reliably with a small driving force and which is adapted for fine adjustment.

Another object of this invention is to provide an apparatus which is constructed of the smallest possible number of components to render the apparatus compact in its entirety, simple in construction and easy to make.

Still another object of this invention is to provide an apparatus which is entirely accommodated in a valve housing and a casing connected together so as to render the apparatus neat in appearance and free from fine dust and to like.

Other objects and advantages of this invention will become more apparent from the following description.

DESCRIPTION OF THE PREFERRED EMBODIMENTS

The mode of this invention as practiced will be described below with reference to the preferred embodiments.

Figure 1:
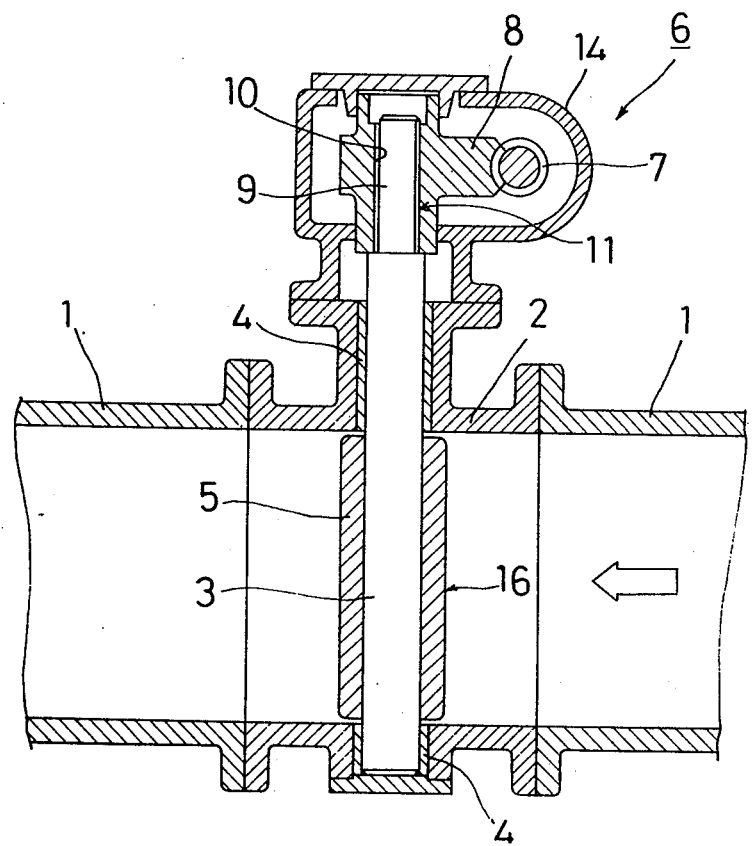
FIG. 1 is a sectional view of a butterfly valve apparatus according to this invention.
Figure 2:
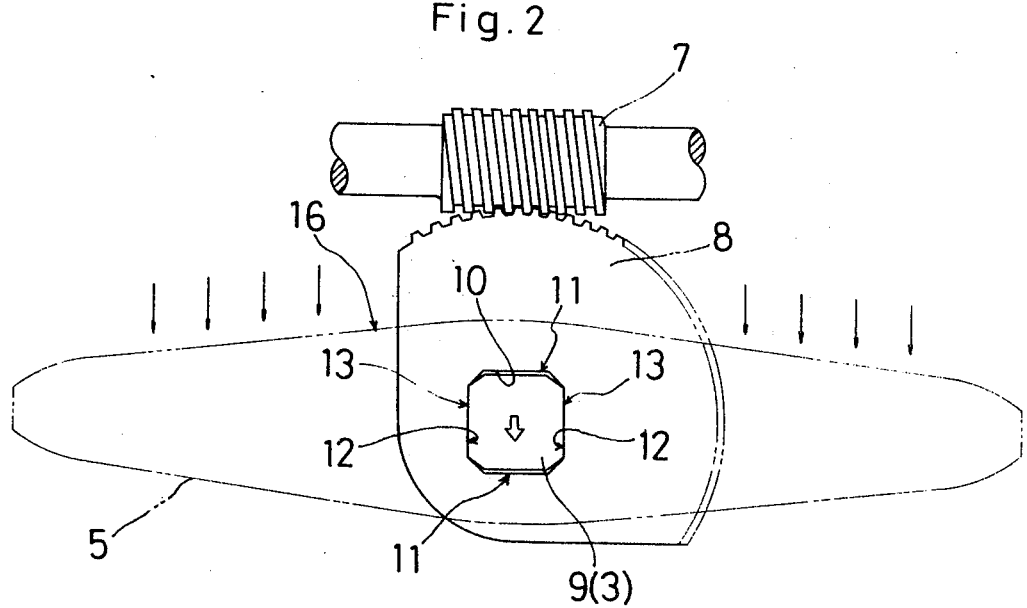
FIG. 2 is a plan view of the principal part of FIG. 1.

FIGS. 1 and 2 show a butterfly valve of this invention. Indicated at 1 is a conduit for passing fluid, at 2 a valve housing installed in the conduit 1, at 3 a valve stem supported by the valve housing 2 with two bearing members 4 and 4 interposed therebetween and positioned one above the other, at 5 a valve plate fixed to the portion of valve stem 3 which is located within the valve housing 2, the valve stem 3 being positioned at the approximate middle of length of the valve plate 5 and also at the approximate middle of thickness of the same. Alternatively, the valve stem 3 may be fixed accentrically of the valve plate 5 with respect the length or thickness of the plate 5.

A coupling member 6, connecting the valve stem 3 to unillustrated rotating means in operative relation, comprises a worm operatively connected to the rotating means and a sector worm gear 8 to be driven by the worm 7. The rotating means may chiefly be an electric or hydraulic motor, but it may be a hand-operated handle. Further the coupling member 6 need not necessarily be the combination of worm 7 and sector worm gear 8 but may alternatively comprise other gears such as bevel gears.

To transmit the torque of the valve stem 3, the sector worm gear 8 is connected in operative relation to one end of the valve stem 3 projecting from the valve housing 2 as described below. The end of the valve stem 3 projecting from the valve housing 2 is integrally formed with a support portion 9 which is rectangular or nearly rectangular as viewed in the axial direction of the valve stem 3, whilst the sector worm gear 8 is formed with a rectangular or nearly rectangular bore 10 which fits around the rectangular support portion 9. The fitting engagement of the rectangular support portion 9 in the rectangular bore 10 connects the sector worm gear 8 to the valve stem 3 for the transmission of torque.

One side of the rectangular bore 10 is slightly greater than the corresponding side of the rectangular support portion 9, or the latter is made slightly smaller than the former, so that the rectangular support portion 9 will intimately fit, over a suitable length, in the rectangular bore 10 with respect to a direction approximately in parallel to the fluid pressure receiving surface 16 of the valve plate 5 in closed position, forming suitable clearances 11 and 11 between the rectangular support portion 9 and the inner surfaces of the rectangular bore 10 with respect to a direction approximately perpendicular to the pressure receiving surface 16. Moreover, the sum of the clearances 11 and 11 is slightly greater than the total sum of the lubricating clearance between the valve stem 3 and the bearing members 4 and 4 supporting the stem and errors produced in machining the valve stem 3 and the like.

In other words, when liquid pressure acts on the valve plate 5 which is closing the flow passage, the clearances 11 and 11 permit relative movement between the valve stem 3 and the rotating means in the direction of action of the liquid pressure, the valve stem and the rotating means being thus rendered movable relative to each other by an amount slightly greater than the amount by which the valve stem 3 and the bearing members 4 and 4 are permitted to move relative to each other. For example, if the sum of the lubricating clearance between the valve stem 3 and the bearing members 4, 4 is 0.025 inch, the sum of the clearances 11 and 11 may be about 0.080 inch.

The construction described above makes it sure that the rotation of the sector worm gear 8 of the coupling member 6 will be delivered, without backlash, to the valve stem 3 through the intimate contact between the surfaces 12, 12 of rectangular bore 10 and the surfaces 13, 13 of rectangular support portion 8, whereas the sector worm gear 8 and valve stem 3 are slidable relative to each other along the intimately fitting surfaces 12 and 13. Accordingly, if the fluid pressure acts on the pressure receiving surface 16 of the valve plate 5, the valve stem 3 will be displaced in the direction of action of the fluid pressure within the range of amount allowed by the bearing members 4 and 4 which support the valve stem 3.

It is to be noted that the sum of the clearances 11 and 11 formed between the rectangular support portion 9 and the inner surfaces of rectangular bore 10 is greater than the maximum displacement of the valve stem 3 relative to the valve housing 2, namely the amount of movement allowed for the valve stem 3 within the clearance between the stem 3 and bearing members 4, 4. Should the valve stem 3 be moved laterally to a full extent, therefore, the rectangular support portion 9 would still remain out of contact with the inner surface of the rectangular bore 10 toward the direction of that movement. Thus only the valve stem 3 is moved laterally with respect to the sector worm gear 8 which is positioned in place, with the result that the fluid pressure acting laterally on the valve plate 5 is received only by the bearing members 4 and 4 in the valve housing 2, without permitting any lateral force to act directly on the sector worm gear 8 and thereby rendering the coupling member 6 operable only for the transmission of torque all the time.

The worm 7, sector worm gear 8, rectangular support portion 9 and the rectangular bore 10 are all housed in a casing 14 which is attached to the valve housing 2, so that the overall apparatus is neat in appearance and free from fine dust and the like.

The support portion 9 and bore 10 which are rectangular are easy to make and yet assure reliable transmission of torque. Alternatively, the support portion 9 and bore 10 may be in the form of an elongated circle having opposing semicircular surfaces and parallel planes continuous therewith. This also ensures reliable torque transmission. Further as seen in FIG. 2, the support portion 9 may further be chamfered and the bore may be shaped in a corresponding form, whereby concentration of stress on the corners can be mitigated during use.

Figure 3:
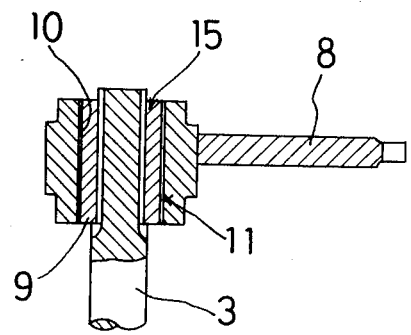
FIG. 3 is a sectional view showing the principal part of another embodiment of butterfly valve apparatus.
Figure 4:
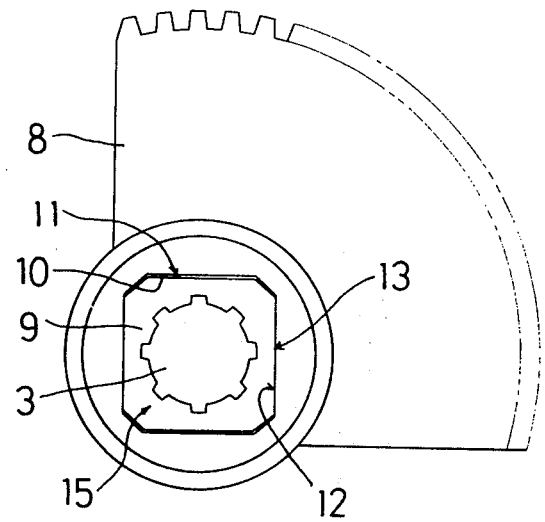
FIG. 4 is a plan view of FIG. 3.

Further according to the embodiment shown in FIGS. 1 and 2, the rectangular bore 10 is formed directly in the sector worm gear 8, whilst the valve stem 3 is machined to form the support portion 9 integrally therewith. Such construction serves to reduce the number of the component parts to render the apparatus easy to make. Further as seen in FIGS. 3 and 4, a separate fitting member may be prepared which is slidable and fittable in place and which is made for example of hardened steel. The separate rectangular member 15 is splined or keyed to the valve stem 3 and/or sector worm gear 8 and is formed with the support portion 9 or the rectangular bore 10.

Although the drawings show the valve stem 3 having the support portion 9 and the sector worm gear 8 formed with the rectangular bore 10, the valve stem 3 may conversely have the bore 10 and the sector worm gear 8, the support portion 9.

Figure 5:
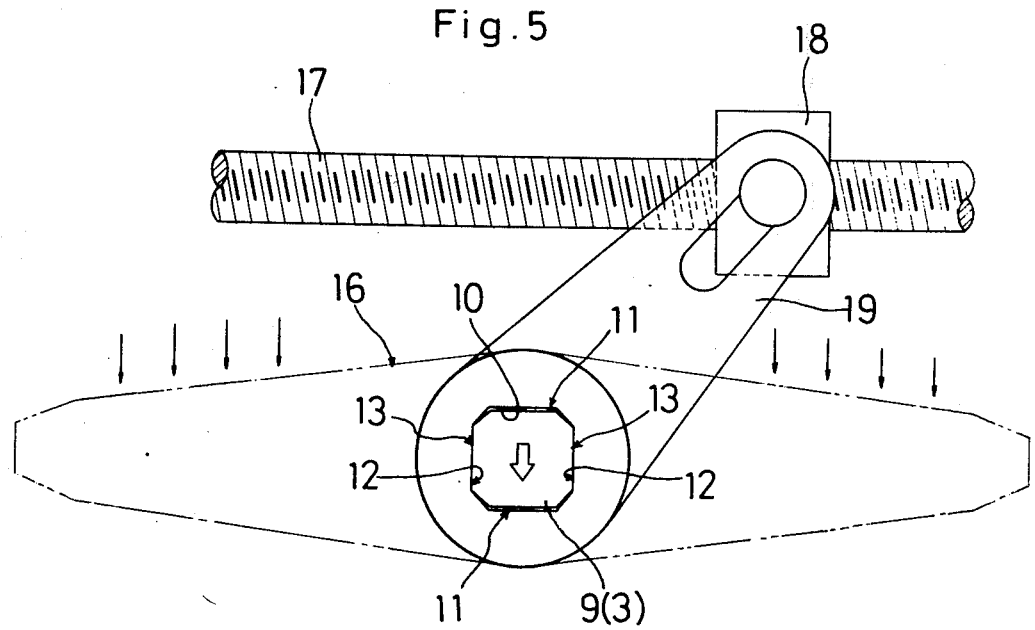
FIG. 5 is a plan view showing the principal part of yet another embodiment of butterfly valve apparatus.

Further, a structure shown in FIG. 5 may be available as said coupling member 6. Thus, the structure comprises a screw 17 driven by a rotation means (not shown), a nut 18 to be driven by the screw 17 and a lever 19 connected to the valve stem 3 and the nut 18 to convert a rectilinear motion of the nut 18 to a rotary motion of the valve stem 3.

Although the valve stem 3 has been illustrated and described in the foregoing description only in its preferred embodiment as arranged vertically, it will be understood that the valve stem 3 may possibly be arranged either horizontally or in any slant direction, as well.

What we claim is:
1. A butterfly valve comprising:
 a housing including a tubular portion for carrying fluid therethrough;
 a rotatable valve shaft arranged to penetrate said tubular portion perpendicularly to the axis thereof, said valve shaft being held in sleeve bearings lo- cated adjacent to opposite walls of said tubular portion and further including a drive stem with a rectangular cross section;

a butterfly valve plate fixedly mounted on said rotatable valve shaft in said tubular portion;

a drive plate, having an aperture arranged to receive the drive stem of said valve shaft and further provided with gear teeth on part of its periphery; and means for oscillating said drive plate the improvement wherein:

said drive plate has a rectangular means defining an opening including opposed longitudinal side dimensions which are perpendicular to the plane of said butterfly valve plate and transverse dimensions of said rectangular means defining the opening lies in planes parallel with said butterfly valve, said valve stem further including a stem portion of rectangular configuration complemental to said rectangular means defining the opening in said drive plate and having a smaller longitudinal dimension than said drive plate opening to thereby permit limited relative sliding movement of said complementally formed elements to thereby compensate for radial clearance in said bearings as well as to relieve pressure on the means motivating said drive plate.

2. A butterfly valve as claimed in claim 1, wherein the stem portion of said valve is provided with a removable keying means which includes said rectangular configuration complemental to said rectangular means defining the opening in said drive plate.

3. A butterfly valve as claimed in claim 1, wherein said rectangular configuration in said drive plate exceeds the rectangular configuration of said valve stem by approximately 0.080 inch to thereby permit relative movement between the valve and the drive plate.

4. A butterfly valve as claimed in claim 3, wherein the drive plate includes a sector worm gear.

5. A butterfly valve as claimed in claim 4, wherein a worm gear is arranged to drive said sector worm gear.

6. A butterfly valve as claimed in claim 5, wherein the worm gear includes an axis that lies parallel to the transverse dimension of said rectangular means defining said opening.

* * * * *